(12) United States Patent
Kristiansson et al.

(10) Patent No.: US 11,915,020 B2
(45) Date of Patent: *Feb. 27, 2024

(54) METHOD AND ARRANGEMENT FOR MANAGING PERSISTENT RICH INTERNET APPLICATIONS

(71) Applicant: Telefonaktiebolaget LM Ericsson (publ), Stockholm (SE)

(72) Inventors: Johan Kristiansson, Luleå (SE); Karl-Johan Lundkvist, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,830

(22) Filed: Mar. 22, 2023

(65) Prior Publication Data

US 2023/0221968 A1    Jul. 13, 2023

Related U.S. Application Data

(63) Continuation of application No. 17/532,032, filed on Nov. 22, 2021, now Pat. No. 11,709,689, which is a
(Continued)

(51) Int. Cl.
*H04L 67/02* (2022.01)
*H04L 67/55* (2022.01)
*G06F 9/451* (2018.01)

(52) U.S. Cl.
CPC ............. *G06F 9/452* (2018.02); *H04L 67/02* (2013.01); *H04L 67/55* (2022.05)

(58) Field of Classification Search
CPC .......... G06F 9/452; H04L 67/55; H04L 67/02
See application file for complete search history.

(56) References Cited

U.S. PATENT DOCUMENTS 6,292,825 B1    9/2001    Chang et al.
7,275,089 B1    9/2007    Marshall et al.
(Continued)

FOREIGN PATENT DOCUMENTS

| JP | H10207805 A | 8/1998 |
| JP | H11265332 A | 9/1999 |
| JP | 2003228529 A | 8/2003 |

OTHER PUBLICATIONS

European Search Report and Search Opinion for European Patent Application No. 19180288.3 dated Dec. 2, 2019, 8 pages.
(Continued)

*Primary Examiner* — Nazia Naoreen
(74) *Attorney, Agent, or Firm* — Sage Patent Group

(57) ABSTRACT

An Application Execution Server and a method for managing a Background Process which is associated with a Rich Internet Application which is accessible via a Web Browser of an Internet Enabled User Device. The Application Execution Server comprises a Background Process Manager which is adapted to create a Background Process, in response to receiving a request for such a process from the Rich Internet Application, the Background Process being adapted to recognize a triggered event associated with said associated rich Internet application and to invoke the Rich Internet Application, irrespective of whether the Web Browser and/or the Rich Internet Application is presently running or not.

21 Claims, 12 Drawing Sheets

Related U.S. Application Data continuation of application No. 16/717,447, filed on Dec. 17, 2019, now Pat. No. 11,204,786, which is a continuation of application No. 16/429,704, filed on Jun. 3, 2019, now Pat. No. 11,216,290, which is a continuation of application No. 13/498,480, filed as application No. PCT/SE2009/051095 on Oct. 1, 2009, now Pat. No. 10,394,582.

(56) References Cited

U.S. PATENT DOCUMENTS

| | | | |
|---|---|---|---|
| 7,325,042 | B1 | 1/2008 | Soscia et al. |
| 7,650,390 | B2 | 1/2010 | Arner et al. |
| 7,802,262 | B1 | 9/2010 | Lynch et al. |
| 7,913,177 | B1 | 3/2011 | Smith et al. |
| 8,045,236 | B2 | 10/2011 | Karmakar et al. |
| 8,341,595 | B2 | 12/2012 | Arner et al. |
| 2003/0018714 | A1* | 1/2003 | Mikhailov ............ H04L 67/02 707/E17.107 |
| 2004/0104947 | A1* | 6/2004 | Schmitt ................ G06F 16/957 707/E17.119 |
| 2007/0106739 | A1 | 5/2007 | Clark et al. |
| 2007/0143182 | A1 | 6/2007 | Faber et al. |
| 2007/0239884 | A1 | 10/2007 | Karmakar et al. |
| 2008/0307043 | A1* | 12/2008 | Dorsey ................. G06F 9/452 709/203 |
| 2009/0077091 | A1 | 3/2009 | Khen et al. |
| 2010/0223569 | A1 | 9/2010 | Vuong et al. |

OTHER PUBLICATIONS

Communication pursuant to Rule 69 EPC for European Patent Application No. 19180288.3 dated Jan. 8, 2020, 2 pages.

Mark L. Murphy, "The Busy Coder's Guide to Android Development," Version 1.0, Jul. 1, 2008, specifically pp. 263-283.

* cited by examiner

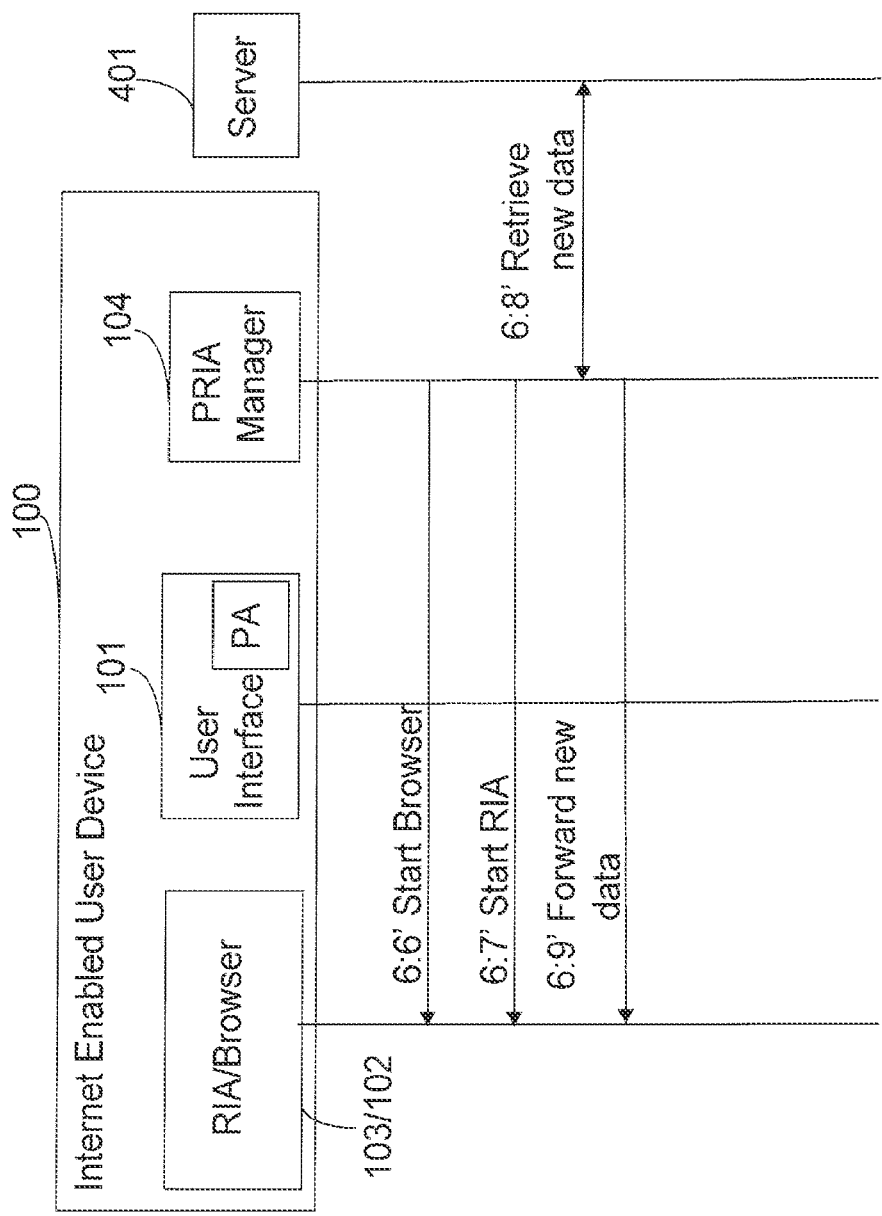

METHOD AND ARRANGEMENT FOR MANAGING PERSISTENT RICH INTERNET APPLICATIONS

CROSS REFERENCE TO RELATED APPLICATIONS

This application is a continuation of U.S. patent application Ser. No. 17/532,032, filed 22 Nov. 2021, which itself is a continuation of U.S. patent application Ser. No. 16/717,447, filed 17 Dec. 2019, now U.S. Pat. No. 11,204,786, which itself is a continuation of U.S. patent application Ser. No. 16/429,704, filed 3 Jun. 2019, now U.S. Pat. No. 11,216,290, which was a continuation of U.S. patent application Ser. No. 13/498,480, filed 27 Mar. 2012, now U.S. Pat. No. 10,394,582, which was a 35 U.S.C. § 371 national stage application of International Application PCT/SE2009/051095, filed 1 Oct. 2009, the entire disclosure of each of which is hereby incorporated by reference herein.

TECHNICAL FIELD

The present invention relates a method for managing and supporting Persistent Rich Internet Applications, and arrangements suitable for enabling a Background Process to gain access to such applications.

BACKGROUND

Today many applications are to a large extent purely Web-based, and thus accessible from any user device which is provided with a Web Browser and Internet access functionality. This type of applications are typically referred to as Rich Internet Applications (RIA) and offers several important benefits to its users, compared to what can be expected from traditional, native applications.

Users using RIAs do no longer have to care about installing applications, or manually keeping the software up to date, since a RIA is loaded from a Web Server every time it is started, instead of being installed locally. From a developer's point of view, development costs associated with RIAs can be cut drastically, since RIAs are generally less complicated to develop and deploy than corresponding native applications. Furthermore, RIAs are important from a business perspective, since they enable companies to quickly obtain a critical mass of users.

The development from native applications to RIAs, can also be seen as a paradigm shift moving from "software-as-an artifact" to "software-as-a-service". Due to this paradigm shift, the internet is about to become a globally distributed operating system. Instead of having native applications running locally in the User Devices, RIA processes may be completely distributed, where some applications are running on the User Device, while other applications may instead be running in the network. Users may access services from a number of different types of user devices, where mobile user devices become only one of many possible entry points to the network.

The mobile user device industry is experiencing a paradigm shift towards open user devices, i.e. user devices which have much in common with traditional desktop computers, which enables users to install new application versions and to customize their user devices all according their personal preferences. Most user devices will in the near future also be provided with a desktop class Web Browser, i.e. a Web Browser which enables the user to browse the Web and get almost the same user experience as if using a classical desktop computer. A most likely consequence will probably be that RIAs running on such user devices will become even more attractive alternatives for many developers, since many users may be reached at reduced development costs.

It is clear that the Web Browser is a critical component for the evolution of the Web. Recent development in Web Browser technologies, typically referring to JavaScript Interpreters and JavaScript Frameworks, allow applications to run much faster, or even without a fully functional Internet connection. However, Web Browsers available today cannot be considered as constituting a fully fledged runtime environment, as it put several constraints on the applications. A RIA can for example not continue to run in the background of another application once the Web Browser or tab/window has been closed.

Another problem with Web Browsers available today is that they are not completely integrated on the desktop, which means that, even if it is possible to put an icon associated with a specific Web service, defining a RIA, such as e.g. a mail service, on the desktop, this service will not be able to notify the user when new mails are received, simply because a RIA will only be running when it is opened in the Web Browser.

SUMMARY

The object of the present invention is to address the problems outlined above. In particular, it is an object of the present invention to provide a mechanism which enables communication to be initiated and resumed between a Background Process, residing on an Application Execution Server, and a Rich Internet Application, residing on an Internet Enabled User Device.

According to one aspect, an Application Execution Server adapted to manage a Background Process, which is associated with a Rich Internet Application, and which is executable on an Internet Enabled User Device, is provided. The Application Execution Server comprises a Background Process Manager which is adapted to create a Background Process, in response to receiving such a request from the Rich Internet Application. A Background Process residing on the Background Process Manager is adapted to recognize a triggered event, associated with an associated Rich Internet Application, and to invoke the Rich Internet Application, irrespective of whether the Web Browser and/or the Rich Internet Application is in an open or closed state, i.e. whether they are running or not. Thereby a Rich Internet Application may be accessed from an associated Background Process, whenever a triggered event raises a demand to communicate with the Rich Internet Application.

The Background Process Manager is typically adapted to create a Background Process by acquiring executable code, e.g. from a Server, according to a received request, and to executing such code, accordingly. The Background Process Manager may be adapted to identify a Server, such as e.g. a third party Server, e.g. by extracting a URL, indicating the required Server location, from the received request.

The Background Process Manager, which is typically adapted to enable interaction between a Background Process and an associated Rich Internet Application, may be provided with a dedicated Server Network Function, which is adapted to enable communication between a Background Process and an associated Rich Internet Application, by supporting a Persistent Communication Channel.

The suggested Application Execution Server may be configured as an integrated part of the Internet Enabled User Device, or as a standalone network entity, being accessible to the Internet Enabled User Device. The former alternative may be preferable e.g. if access to applications is required, even when no access to a network is possible, while the latter alternative may be to prefer in situations where battery consumption is a critical issue.

According to another aspect, an Internet Enabled User Device, which is suitable for enabling communication between a Rich Internet Application and an associated Background Process, residing on an Application Execution Server, is provided. Such an Internet Enabled User Device comprises a functional entity, which may be referred to as a Persistent Rich Internet Application Manager, and a User Interface. The Persistent Rich Internet Application Manager is adapted to request for a Background Process to be created at the Application Execution Server, and for an associated, Perceptible Artifact to be set-up on the User Interface. The Persistent Rich Internet application Manager is also adapted to support communication between a running Background Process and an associated Perceptible Artifact, irrespective of whether the Web Browser and/or Rich Internet Application is running or not.

The Persistent Rich Internet Application Manager is typically adapted to receive a request for initiating a Background Process from the Rich Internet Application, and/or from the Web Browser.

Furthermore, the Persistent Rich Internet Application Manager may be provided with a dedicated Client Network Function, which is adapted to enable persistent communication between a Rich Internet Application and an associated Background Process by providing a persistent communication channel between the Persistent Rich Internet Application Manager and the Application Execution Server. Such a persistent communication channel may e.g. be based on a Remote Procedure Call mechanism or a Representative State Transfer mechanism.

The Persistent Rich Internet Application Manager typically comprises logic which is adapted to perform one or more functions, according to instructions associated with the Rich Internet Application. Such instructions may be provided to the Persistent Rich Internet Application Manager from an associated Background Process, via the persistent communication channel, and may comprise instructions on how to acquire executable code, that is associated with a specific Background Process.

In addition to being adapted to interact with a Background Process and an associated Rich Internet Application, the Persistent Rich Internet Application Manager may also be adapted to interact with one or more Device Interfaces of the Internet Enabled User Device, according to instructions provided from the Background Process. Via the Device Interface, one or more internal functions of an Internet Enabled User Device may be accessed by the Persistent Rich Internet Application Manager and the Background Process.

The suggested Internet Enabled User Device may be a fixed user device, such as e.g. a PC, or a wireless user device, such as e.g. a laptop, a PDA or a mobile telephone.

According to yet another aspect, a method for managing a Background Process which is associated with a Rich Internet Application that is executed on an Internet Enabled User Device, is also provided. According to this method, a Background Process is created by executing instructions, in accordance with a request for a Background Process, which is received from the Rich Internet Application, running on the Internet Enabled User Device. The Background Process is adapted to recognize a triggered event, associated with the associated Rich Internet Application, and to invoke the Rich Internet Application, irrespective of whether the Web Browser and/or the Rich Internet Application are/is running or not.

The method may comprise the further steps of receiving a notification request from the Background Application, requesting a notification, associated with a Rich Internet Application, where the request is triggered by the event, and transmitting the notification request to the Internet Enabled User Device, thereby enabling notification of the event at the Internet Enabled User Device.

According to a further aspect, a method for enabling communication between a Rich Internet Application, which is accessible from an Internet Enabled User Device, and an associated Background Process, which reside on an Application Execution Server, is provided. The method which is applied on an Internet Enabled User Device, comprising a Persistent Rich Internet Application Manager and a User Interface, is initiated when a request for creating a Background Process is received from the Rich Internet Application. In response to receiving such a request, an associated Perceptible Artifact is set-up on the User Interface, and the Application Execution Server is requested to create a Background Process, according to the request. Once a Background Process has been created, the Internet Enabled User Device is adapted to manage communication between the Background Process and the Perceptible Artifact, in response to receiving a notification from the Background Process, irrespective of whether the Web Browser and/or the Rich Internet Application is running or not.

The mentioned method may comprise the further steps of receiving a message comprising a notification from the Application Execution Server; notifying the Rich Internet Application, and supporting communication between the Persistent Rich Internet Application Manager and the Rich Internet Application, according to pre-defined instructions, if said notification is approved with via the Perceptible Artifact. According to yet another method step, the Internet Enabled User Device may process messages communicated between the Background Process and a Device Interface of the Internet Enabled User Device, thereby enabling the Background Process access to the Device Interface, and thereby also a sensor or function, implemented on the Device Interface.

Further features of the present invention and its benefits can be understood from the detailed description following below.

BRIEF DESCRIPTION OF THE DRAWINGS

The present invention will now be described in more detail by means of exemplary embodiments, and with reference to the accompanying drawings, in which:

FIG. 6c is a simplified signaling scheme, illustrating another procedure for enabling interaction between a Persistent Rich Internet Application and a Background Process, according to another exemplified embodiment.

DETAILED DESCRIPTION

Figure 1:
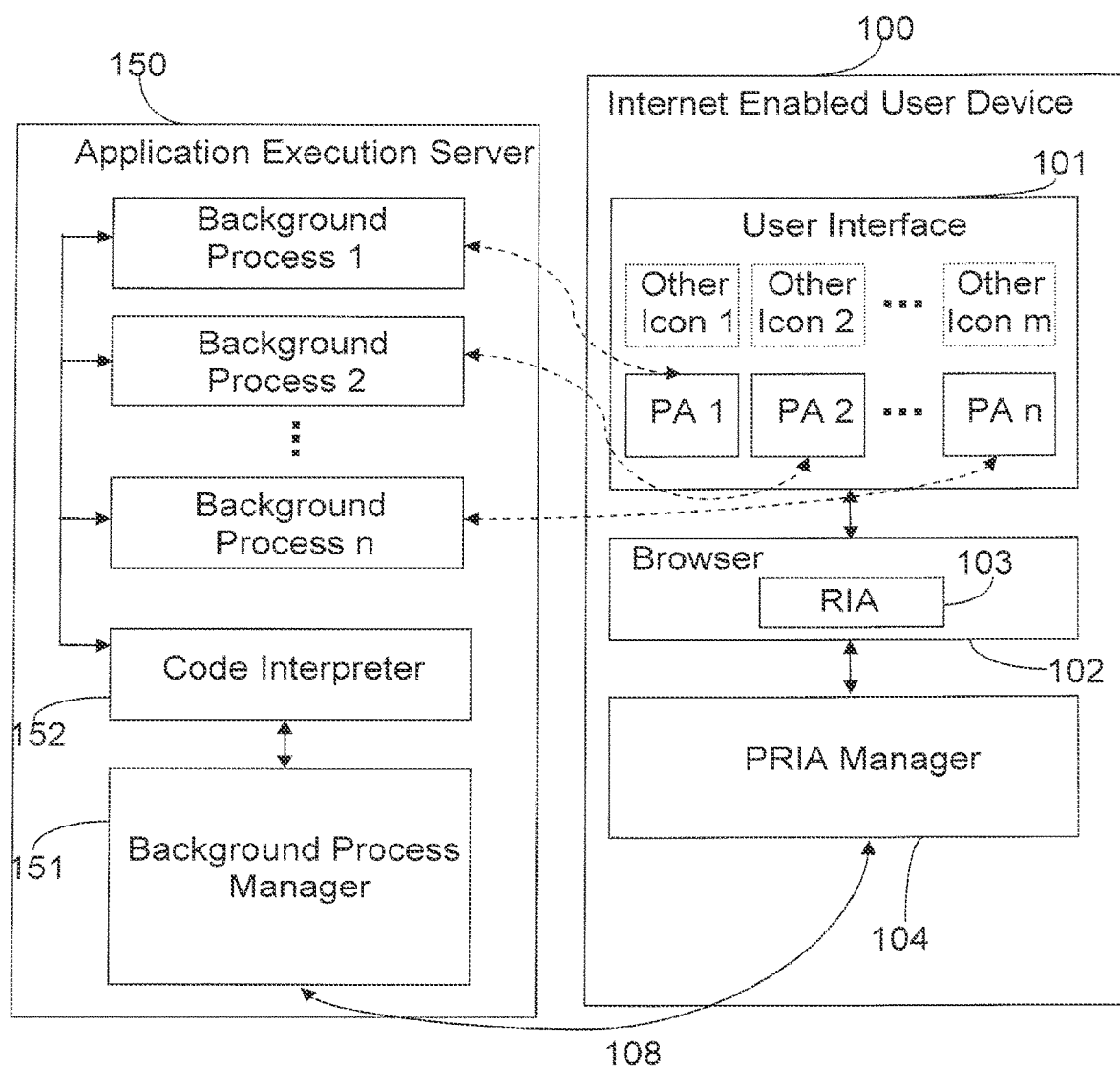
FIG. 1 is an illustration of block diagrams, comprising an Application Execution Server and an Internet Enabled User Device, which are adapted to use Persistent Rich Internet Applications, according to one exemplary embodiment.

The general idea behind the claimed invention is to enhance the user experience for a user when browsing Web Applications, or more specifically, to enhance the user experience for a user using a RIA, which is running on an Internet Enabled User Device, by enabling a dedicated Background Process to run in the background of, but separated from an associated main Web Browser process, i.e. a RIA, such that the process may invoke the RIA, irrespective of whether the respective RIA is running or not. This means that even though the associated RIA has been terminated, i.e. the Web Browser tab of the RIA has been removed, and/or the complete Web Browser has been closed, an initiated Background Process will continue to run until it itself is also actively terminated, meanwhile being able to alert the user of triggered events, such that the user, after being alerted of an event, may choose to invoke the closed RIA again.

In the present context a RIA is to be interpreted in its broadest sense as disclosing any kind of dynamic Web based application which can be run on an Internet Enabled User Device.

As is well established in the context of executable applications, a process can be referred to as a computer program product, residing on at least one core, which may constitute one or more executable objects, each of which is consisting of one or more threads, where each thread is being sequentially executed by an entity, comprising conventional computer system functionality, that has the ability to run several computer programs concurrently. In case of a multi-core system, different threads may be executed in parallel.

In the present context a Background Process is to be referred to as a process, which is started from a RIA via a main Web Browser process, but which, once started, may be run independent of the main process in a separate runtime environment outside the Web Browser, while, from a developer point of view, still being perceived as a logical process, which is running inside the Web Browser. In the present context we may also refer to such Background Processes as Application Scopes.

A Background Process will be able to actively monitor activities associated with the associated RIA, and to communicate with the RIA, and optionally also with other functional entities of an Internet Enabled User Device e.g. via a Device Interface.

A Background Process may have been configured to invoke an associated RIA for a number of reasons. One reason may e.g. be that a user, wanting to be updated with certain changes, or events, whenever they may occur have requested a Background Process, for accomplishing such tasks. Another reason for invoking a RIA may be related to call control or service invitation, where e.g. a user is invited to a collaborative Web service, or to respond to an incoming telephony RIA or an incoming Instant Messaging RIA. According to the claimed invention, such Background Processes can maintain running irrespective of whether the Web Browser and/or the associated RIA is closed or kept open.

In order to exemplify the concept described above, two typical use cases will now be presented below.

In a first use case, user Bill browses the Web from a user device, and finally selects a Web application (RIA) that he finds interesting. The application is a sports Web page that displays the latest NHL results on user device in real time. The Web application offers Bill the option to add a specific type of icon on the user device's dashboard, simply by prompting the user with a suitable dialogue in association with selectable buttons. Bill likes the offered extension of the present application and activates a "Yes" button provided in the dialogue, which initiates the installation of an enhanced Web application and a new icon, which is associated with the enhanced application, appears on the dashboard. Bill then closes the Web application and continues to browse the Internet. After a while, the recently introduced icon changes appearance, such that a little star is presented in the upper left corner of the dashboard. Bill is aware of the modification of the icon and realises with excitement that something which relates to the enhanced Web application has occurred, and, without hesitation he clicks on the icon, and as a result the closed Web application is again launched in the Web Browser. Bill can now see on the dashboard that his favourite team has scored and is now in the lead.

According to another exemplifying use case, which instead refers to a Voice over Internet Protocol (VoIP) application a user, Peter, browsing the Web, ends up on a Web VoIP application that he finds interesting. Peter activates a button appearing on the display of his user device, and thus makes the selected application persistent. An icon in the form of a traditional fixed telephone appears on the display. Once he has completely entered his credentials, such as e.g. username and password, via a dialogue appearing on the display, Peter closes the Web Browser and continues his exploration of the Internet. He also makes sure that his closest friends are made aware of his username which is valid for the described VoIP service. Later on Peter notices how the telephone icon on the display is changing colour and a ringing sound appears from the speakers of the user device. In response Peter activates the telephone icon and the VoIP application starts in the Web Browser. Peter notices that his friend Bill is calling him, and in response he activates an "answer" button appearing in the Web application and can now start to talk to his friend.

A Background Process will normally be managed and maintained running until it is actively terminated from the Internet Enabled User Device on which it was originally created, or until the task, or tasks, for which it has been specified has/have been successfully completed. Alternatively, the Background Process may be terminated by the Background Process Manager if it has discovered suspicious or harmful code.

A RIA, together with an associated Background Process, which has been set to operate in accordance with the suggested mechanism, constitutes a new persistent application concept, which can be referred to as a Persistent Rich Internet Application (PRIA). Each PRIA will consist of two entities, namely a representation entity, located on the Internet Enabled User Device, and a Background Process entity, which is executing specific tasks associated with the PRIA. This type of representation entity can be implemented by applying a Perceptible Artifact (PA) concept. A PA concept which enables a user to be alerted, typically via a visual or sound experience, thus constitutes a link between a Background Process and an associated RIA, which enables the Background Process to invoke the RIA. The PA is a dynamic representation entity which may typically have been configured such that it can change its appearance, e.g. by changing size, colour and/or shape.

Each Background Process will be associated with a PA that will be accessible via a User Interface (UI) of the Internet Enabled User Device. The PA concept allows a user to easily maintain control over activated Background Processes, to terminate a Background Process whenever required, as well as to allow a Background Process to interact with a user e.g. by modifying an associated PA, and to interact with a process of an Internet Enabled User Device. In other words, the PA can be seen as a tool for the Background Process to notify, or alert, a user of an Internet Enabled User Device of a triggered activity that is associated with a specific RIA, now constituting a PRIA, such that it is then up to the user to determine if he wish to continue with notified event or not.

Once the user has been alerted he may choose to proceed by activating the PA, thereby instructing the Persistent Rich Internet Application Manager to continue the initiated process, according to corresponding instructions of the respective Background Process.

An exemplifying system architecture that is suitable for providing the enriched Background Process concept described above, will now be described in more detail with reference to FIG. 1.

It is to be understood that the figures of this document merely describe exemplified embodiments, where defined functional units are to be referred to as logical units and that other units, which are normally relevant in the present context, but which are not necessary for the understanding of the suggested mechanism may have been omitted for simplicity reasons. The Internet Enabled User Device described in FIG. 1 does, for example also normally comprise conventional communication means, necessary for enabling the User Device to communicate with the Internet and external network servers.

The claimed invention is basically based on a functional entity which is residing on an Internet Enabled User Device and which is configured to manage initiation and termination of a PRIA, As well as to process communication steps, associated with the PRIA. This entity, which will from hereinafter be referred to as a PRIA Manager, interacts with another generic entity, which is adapted to manage one or more Background Processes. From hereinafter the latter entity will be referred to as an Application Execution Server.

For each PRIA, a separate Background Process is launched and managed at the Application Execution Server. For such a purpose a functional entity, which from hereinafter will be referred to as a Background Process Manager, is provided on the Application Execution Server. The Background Process Manager is configured to acquire certain executable code, such as e.g. Flash, JavaScript, Java, Flash or HTML, which has been pre-configured for an associated RIA, in response to receiving a request for a new Background Process from the PRIA Manager. In order to be able to create the correct Background Process, such a request may typically comprise instructions, such as e.g. a URL, indicating where to retrieve the appropriate code, i.e. from where the code can be downloaded.

FIG. 1 is an illustration of an Internet Enabled User Device 100, which is configured to access RIA's on the Internet, i.e. a User Device, provided with a Web Browser 102. The Web Browser 102 allows a user to access and browse RIAs in a conventional manner. The Internet Enabled User Device 100 of FIG. 1 also comprises a UI 101, which may be a graphical UI, such as e.g. a Desktop or Dashboard, an audio based UI, or any other type of UI which enables the chosen type of PAs to be applied.

Even if the UI typically may be configured as a visual UI, where the PA is an icon or a widget, neither the UI, nor the PAs are restricted to such solutions. A UI may e.g. be an audio based UI, where a user is alerted via sound and even the user may be able to respond to such an alert, or trigger, by interacting with the PA using sound.

Alternatively, the PA may relay on a combination of visual and sound effects.

A user can be alerted from a Background Process via a notification and get access and respond to a PRIA via an associated PA (PA 1-PA n), which will appear on a UI 101 of the Internet Enabled User Device 100 when a PRIA is installed. In a typical scenario, UI 101 will also display conventional Icons (Icon 1-Icon m), e.g. Icons, associated with native applications, if a graphical UI is applied.

The Application Execution Server 150 may be configured as an integrated part of Internet Enabled User Device 100, or as a standalone entity, which is located somewhere in the communication network. An Application Execution Server that is part of an Internet Enabled User Device may be a preferred choice if PRIAs are to be run even when access to the communication network is not possible, or for some reason not desirable, while an Application Execution Server that is implemented in a communication network node may be a preferred alternative in a number of other situations, but particularly in situations were battery consumption at the Internet Enabled User Device is a critical issue.

From one or more of the RIAs one or more PRIAs may be launched, typically by offering a user the option to create a PA, which has been pre-defined for a specific task. Because of their dynamic nature and their distinction from conventional Icons, PA's, implemented as Icons may also be referred to as Live Icons.

Each PA (PA 1-PA n) will be mapped to a respective Background Process (Background Process 1-Background Process n), which is residing on the Application Execution Server 150, such that e.g. PA 1 is mapped to Background Process 1.

Via a PA a user will be able to easily create, control and terminate an associated Background Process. A Background Process may be created by the user, responding to a dialog prompted to the user. Such a dialogue will typically be initiated by a respective RIA where a user is asked whether he wishes to launch a certain PRIA. Such a dialog may be executed either directly from the RIA 103, using either a Web application API, such as e.g. a JavaScript API, or via a dedicated function provided by Web Browser 102, similar to the mechanism applied when adding a bookmark, which is a functionality which today is available in all conventional Web Browsers. Alternatively, a Background Process may be created automatically, in response to some trigger implemented in the processing code of the RIA.

Figure 2A:
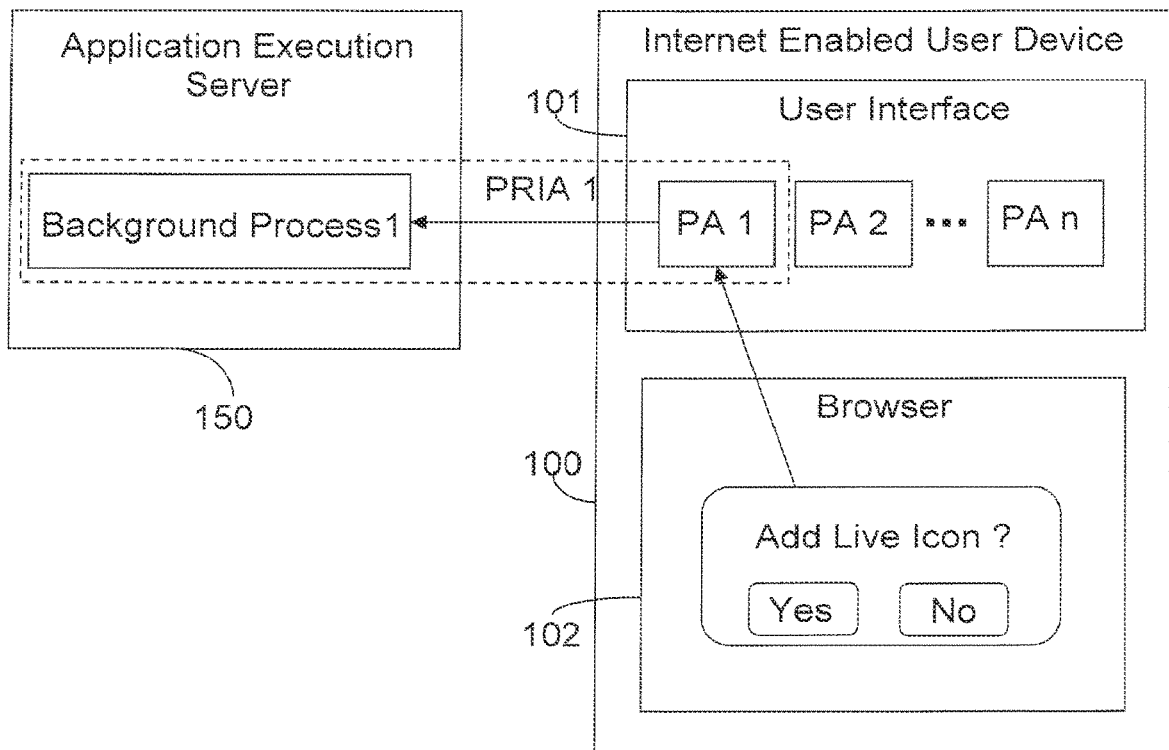
FIG. 2a is a simplified illustration of a Background Process and an associated Persistent Rich Internet Application.

An exemplifying scenario, describing how a Background Process may be created via Web Browser 102, will now be presented in more detail below, with reference to FIG. 2*a*.

An activation of PA 1 by a user browsing a RIA initiates a PRIA, namely PRIA 1, which means that, in addition to activating PA 1 on the UI 101 of the Internet Enabled User Device 100, Background Process 1 is created at the Application Execution Server 150. According to FIG. 2*a* this may be achieved by the user choosing to select "Yes", when a question, such as e.g. "Add Live Icon?", appears on the display of UI 101.

Figure 2B:
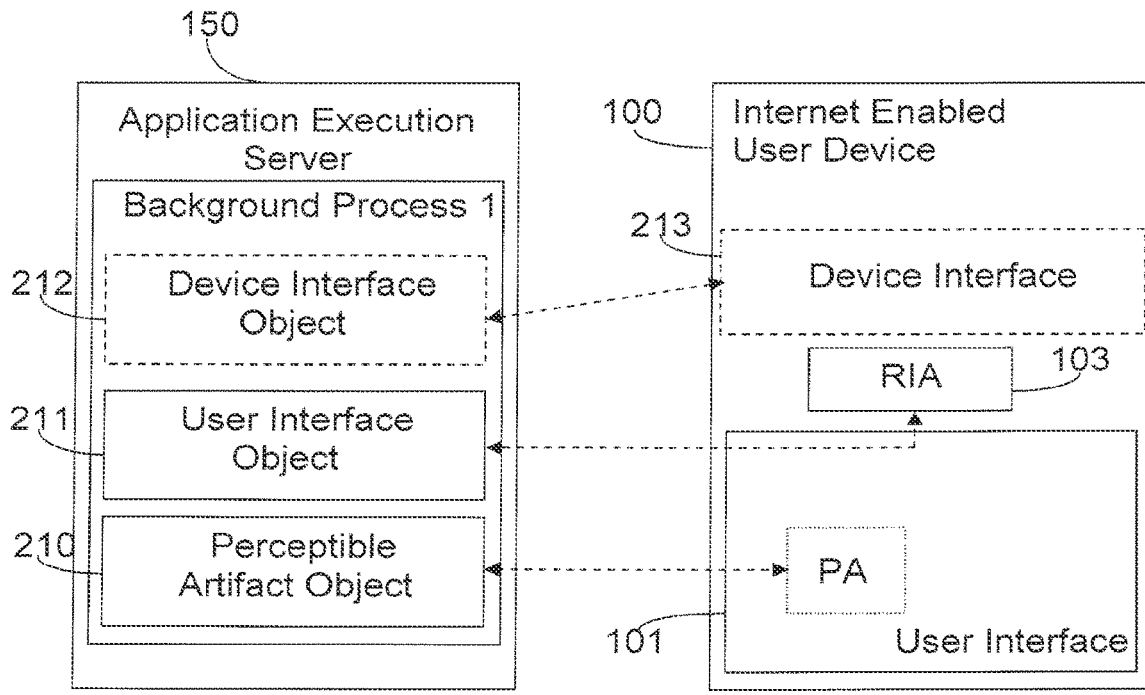
FIG. 2b is a simplified illustration of a Persistent Rich Internet Application.

Interaction between an Internet Enabled User Device and a Background Process can also be described according to FIG. 2*b*, where code which has been configured to run a Background Process may perform tasks such as e.g. calculations, and enable communication between the Background Process and an associated RIA of the Internet Enabled User Device. Such code, constituting a Background Process, comprise both code which enables communication between Background Process 1, and the associated PA of an Internet Enabled User Device 100, i.e. for providing an alert to UI 101, in the present example, represented by a Perceptible Artifact object 210, and code which enables communication between Background Process 1 and the associated RIA, via UI 101, here represented by a User Interface Object 211.

FIG. 2*b* also comprises an optional Device Interface Object 212, which is configured to enable interaction Between a Background Process and a Device Interface 213 of the Internet Enabled User Device 100. Such an Object may be configured to perform certain tasks, with or without having to involve the associated RIA, and may include tasks, such as e.g. checking battery status, radio coverage, or the location of the Internet Enabled User Device 100.

From a developer's point of view, the code running in a Background Process seems to be running locally on the User Device, while the code may actually be running on a remote location in a communication network.

The architecture of an exemplified Application Server and an Internet Enabled User Device, described above with reference to FIG. 1, will now be described in more detail, with reference to FIG. 3. For simplicity reasons, some functionality of FIG. 1 has been omitted in FIG. 3.

The PRIA Manager 104 is responsible for creating PA's, on the UI 101, and to request for a Background Process from the Application Execution Server 150. The PRIA Manager 104 is also configured to create and maintain a communication channel 108 between the Internet Enabled User Device 100 and the Application Execution Server 150, which is to be used for enabling reliable communication between Background Processes (Background Process 1-*n*) and their respective, associated PA (PA 1-*n*). A communication channel which supports Remote Procedure Call (RPC) communication, or a Representational State Transfer (REST) mechanism, may be used for this purpose.

A Background Process is adapted to alert a PRIA Manager 104 by generating and transmitting a message to the PRIA Manager 104, which is adapted to process such a message, such that a subsequent interaction between the Background Process and the associated RIA can be obtained.

As already mentioned above, the Application Execution Server 150 requires functionality, which allows it to interact with the PRIA Manager 106. According to FIG. 1, such functionality may be implemented as a dedicated functional entity, referred to as a Background Process Manager 151.

The Background Process Manager 151 is adapted to create Background Processes on request from the PRIA Manager 104, as well as to manage already created Background Processes, and to enable Background Processes to communicate with the Internet Enabled User Device 100.

The Background Process Manager 151 is responsible for the life cycle management of each running Background Process (Background Process 1-*n*) on Application Execution Server 150. This means that it is adapted to listen for incoming requests, to create new Background Processes that may arrive from a PRIA Manager 104 via an established communication channel 108, and to respond to such a request by acquiring associated code from a code source (not shown), such as e.g. a third party server, and to generate a new Background Process by executing downloaded code. Alternatively, some or all relevant code may already be stored at a storage means of the Application Execution Server 150.

The Application Execution Server 150 also comprises a Code Interpreter 152, or any corresponding functionality, which is connected to the Background Process Manager 151 and configured to interpret executable code.

According to one alternative embodiment, a complete rendering engine (not shown), such as e.g. WebKit or Mozilla Gecko both of which contain a respective JavaScript Interpreter, may be embedded into the Application Execution Server 150, in case JavaScript is applied as executable code. According to yet another alternative embodiment, a standalone Code Interpreter (not shown), such as e.g. Mozilla Rhino, may be embedded into the Application Execution server 150.

The PRIA Manager 104 of an Internet Enabled User Device 100 and the Background Process Manager 151 of an Application Execution Server 150 may both be implemented in a number of various ways. PRIA Manager 104 of FIG. 3 also comprise a PA/RIA function 301, which is connected to a Client Network Function 300, and functionality for enabling interaction with a RIA 103 via a Web Browser 10, implemented as a Web Server 302 and/or a Web Browser Communication Function 303.

The PA/RIA Function 301 is a logic function which is adapted to implement the PA concept described above, i.e. the PA/RIA Function 301 supports the applied PA, and the associated alerting functionality.

According to one exemplified embodiment, the PA/RIA Function 301 may be configured to support a graphically adaptable Icon on a Desktop. When a user which has been notified of an event from a Background Process via such a PA/RIA function, he may click on the Icon, whereby the RIA/PA function may respond by starting an associated RIA e.g. by activating a standard platform Icon API, or any other corresponding standard technology. Alternatively, the user may ignore the notification, and the offered PRIA feature.

The notification mechanism may be applied e.g. by implementing an Ubuntu Linux desktop Icon, which may be supported e.g. by a D-Bus Interface.

According to another exemplified embodiment, a PA/RIA function 301 may instead be configured to support interaction via an audio based User Interface, such that a user is notified of an event, e.g. by playing sound via speakers of an Internet Enabled User Device. In such a scenario, a user may respond to such a notification e.g. by activating a graphical Icon, or by using a speech command via a known speech processing technology.

Furthermore, a PA/RIA Function 301 may also be configured to support interaction between a Background Process and Functionality of the Internet Enabled User Device via a Device Interface of the Internet Enabled User Device.

The PA/RIA Function 301 is adapted to receive requests for a new PRIA from Web Browser 102, either via Web Server 302, which may e.g. be adapted to handle requests provided as standard XML HTTP Request objects, or via Web Browser Communication Function 303, which may be configured as a Web Browser plug-in, such as e.g. a Netscape Plug-In Application Programming Interface (NPAPI) or a WebKit plug-in, which is adapted to communicate with the PRIA Manager 106, using an inter-process communication protocol, which rely on shared memories, pipes or sockets.

According to one embodiment, the PA/RIA function 301 may be adapted to support insertion of a URL into a message, requesting for a Background Process and to provide such a message to a corresponding Server Network Function 310 via Client Network Function 300 which is adapted to manage the communication with the Application Execution Server 150.

If no communication channel is already established between the Background Process Manager 151 and the PRIA Manager 104, the Client Network Function 300 is adapted to provide a communication channel between these two functions.

The PA/RIA Function 301 is also adapted to handle notifications received from a Background Process. The PA/RIA Function 300 may be configured to process a requested notification only if the Web Browser 102 and/or the associated RIA are/is in a closed, non-running state. Such a feature may be obtained by the PA/RIA Function 301, being configured to recognizing when a user's connection with the Web Browser 102 has terminated, or when a Web Browser is no longer connected to a certain RIA. A D-Bus mechanism may e.g. be used for this purpose. If the PA/RIA Function recognizes that neither the Web Browser 102, nor the associated RIA is presently closed, it may instead be configured to commence with the processing, according to the instructions for the respective PRIA.

If, a notification is to be processed, a user may decide to respond to the notification, by approving with a notified activity, by activating the relevant PA, whereby the PA/RIA Function 301 is adapted to recognize such an approval and execute additional activities, according to PRIA specific code.

The described communication functionality may e.g. be realized by applying a Remote Procedure Call (RPC) mechanism, such as e.g. Extensible Markup Language (XML)-RPC, JavaScript Object Notation (JSON)-RPC, or a Representational State Transfer (REST) mechanism.

In order to limit the wait time for approval of a notification, the PRIA Manager 104 may also comprise a conventional timer which is adapted, such that if no approval has been received when a pre-defined time limit has expired the process initiated by the notification is terminated. Accordingly, also the Background Process Manager 151 may comprise a corresponding timer functionality.

As already mentioned above a Background Process Manager 151, may comprise a Server Network Function 310, which is adapted to interact with a corresponding Client Network Function 300, in order to support communication via a communication channel.

If applicable, the Server Network Function 310 may be adapted to extract a URL from a request for a Background Process, thereby enabling relevant executable code, necessary for an associated Background Process, to be acquired in a straight forward manner.

Since it is usually not feasible to have a Client Network Function 300 polling a corresponding Server Network Function 310 for new information for each active Background Process, which would lead to excessive battery consumption at the Internet Enabled User Device hosting the Client Network Function 300, a server initiated push based communication channel is preferred between the two functions. Therefore a mechanism, which is based on a known technical solution, such as e.g. SMS, Comet, BOSH, Web sockets, or Server Sent Events, may be applied for this purpose, if the Application Execution Server 150 is located in the network. If the Application Execution Server 150 has instead been configured as a part of the Internet Enabled User Device 100, a conventional TCP socket, or any other type of suitable Inter-Process Communication protocol may instead be used for this purpose.

To avoid management of separate connections for each Background Process and, thus, a need for excessive energy consumption e.g. due to activation of a plurality of PAs on the Internet Enabled User Device, one communication channel will be adequate to maintain communication between a Internet Enabled User Device and an Application Execution Server. Such a channel will typically be maintained at least as long as there is any Background Process running on the Application Execution Server. Consequently a PRIA Manager only need one communication channel per Application Execution Server, but can have multiple communication channels open to different Application Execution Servers.

Figure 3:
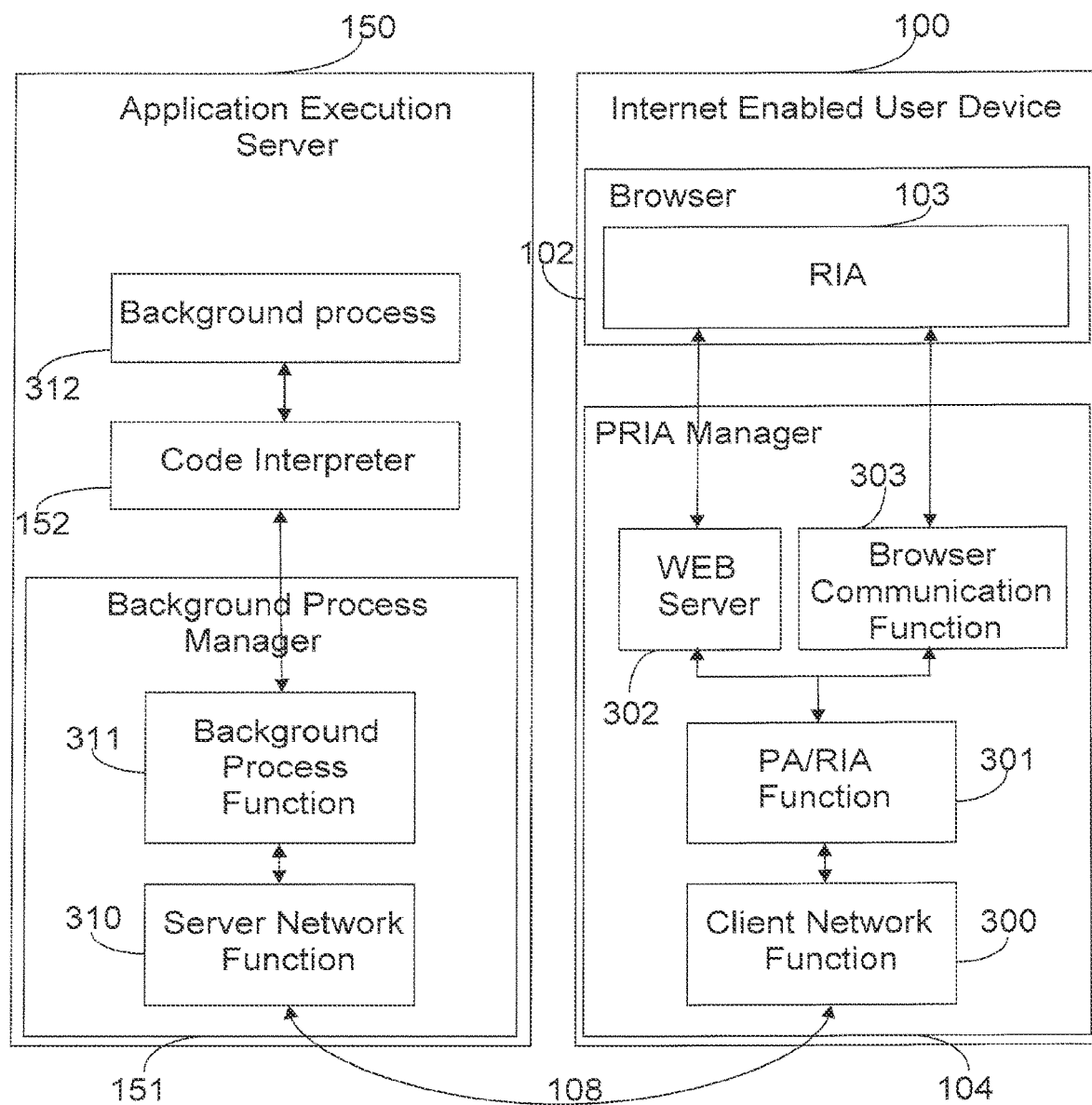
FIG. 3 is a more detailed illustration of the block diagram of FIG. 1, according to one exemplary embodiment.

The Background Process Manager 151 of FIG. 3 also comprises a Background Process Function 311, which is connected to the Server Network Function 310 and the Code Interpreter 152. The Background Process Function 311 typically hosts logic with is adapted to create and terminate new Background Processes according to pre-defined instructions, and, if necessary, to acquire code, required for creation of the Background Process, e.g. from an external code source, and/or from a memory (not shown), which may reside on the Application Execution Server.

Below, a number of exemplifying scenarios which are based on the previously described Background Process concept will now be described in further detail below, with reference to FIGS. 4-6c, respectively.

Figure 4:
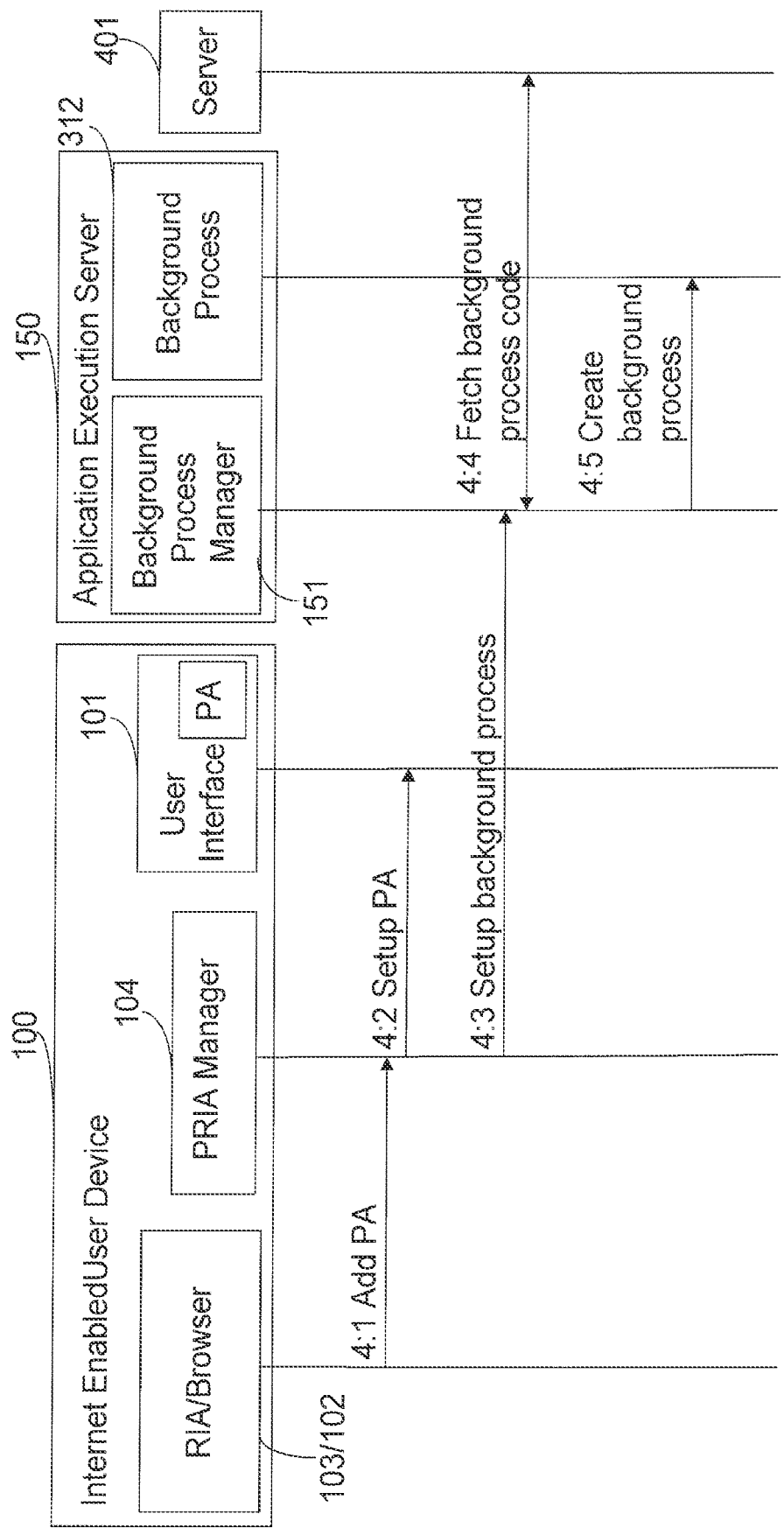
FIG. 4 is a simplified signaling scheme, illustrating a procedure for creation of a Background Process, and, thus, for setting up a Persistent Rich Internet Application, according to one exemplified embodiment.

FIG. 4 is a general signaling diagram which illustrates how an Internet Enabled User Device 100 may interact with an Application Execution Server 150 in order to launch, or create a Background Process and, thereby a PRIA.

In a first step 4:1, a user, browsing a RIA 103 via Web Browser 102, selects to add a PA, such as e.g. a Live Icon, to the UI 101 of an Internet Enabled User Device 100, either by interacting with PRIA Manager 104, via RIA 103 or directly via Web Browser 102. PRIA Manager 104 identifies the relevant RIA and sets up the PA, according to pre-defined instructions, as indicated with a subsequent step 4:2.

Parallel to setting up the PA, PRIA Manager 104 also generates and transmits a message to a Background Process Manager 151 of Application Execution Server 150, where the message comprises a request for setting up a new Background Process, as indicated with another step 4:3. In the present example we assume that a channel is already established between the Internet Enabled User Device 100 and the Application Execution Server 150. If this would not be the case, such a communication channel would have to be set up by the PRIA Manager at this stage.

The Background Process Manager 151 responds to the request by creating a Background Process 312, according to the request. This is typically achieved by executing pre-defined functions, i.e. by running pre-defined code, specifically configured for the chosen PRIA, at the Background Process Manager 151. In order to enable the Background Process Manager 151 to identify the relevant PRIA, and, thus, to create the relevant Background Process, PRIA Manager 104 may have added a URL, or any other information which allows a source hosting PRIA associated code to be identified, to the message which is delivered in step 4:3.

As indicated with a next step 4:4, Application Execution Server 150 extracts the URL, or any other corresponding information, from the message and uses this information to acquire relevant Background Process code from a third-party server 401, or any other source from where the relevant code may be downloaded. Alternatively, the relevant code may already reside on the Application Execution Server 150. The Background Process Manager 151 injects the PRIA associated code into a new Background Process, which from now on will execute the PRIA associated code in the background of the RIA from which the process was originally started.

The PA, together with the associated Background Process, now constitutes a PRIA which will normally remain active until it is closed e.g. by a user manipulating the PA, upon completion of one or more events in the associated Background Process, or upon detection of erroneous or suspicious code, but irrespective of whether the Web Browser 102 and/or the RIA 103 from which the PA was originally created is active/open or not.

Figure 5:
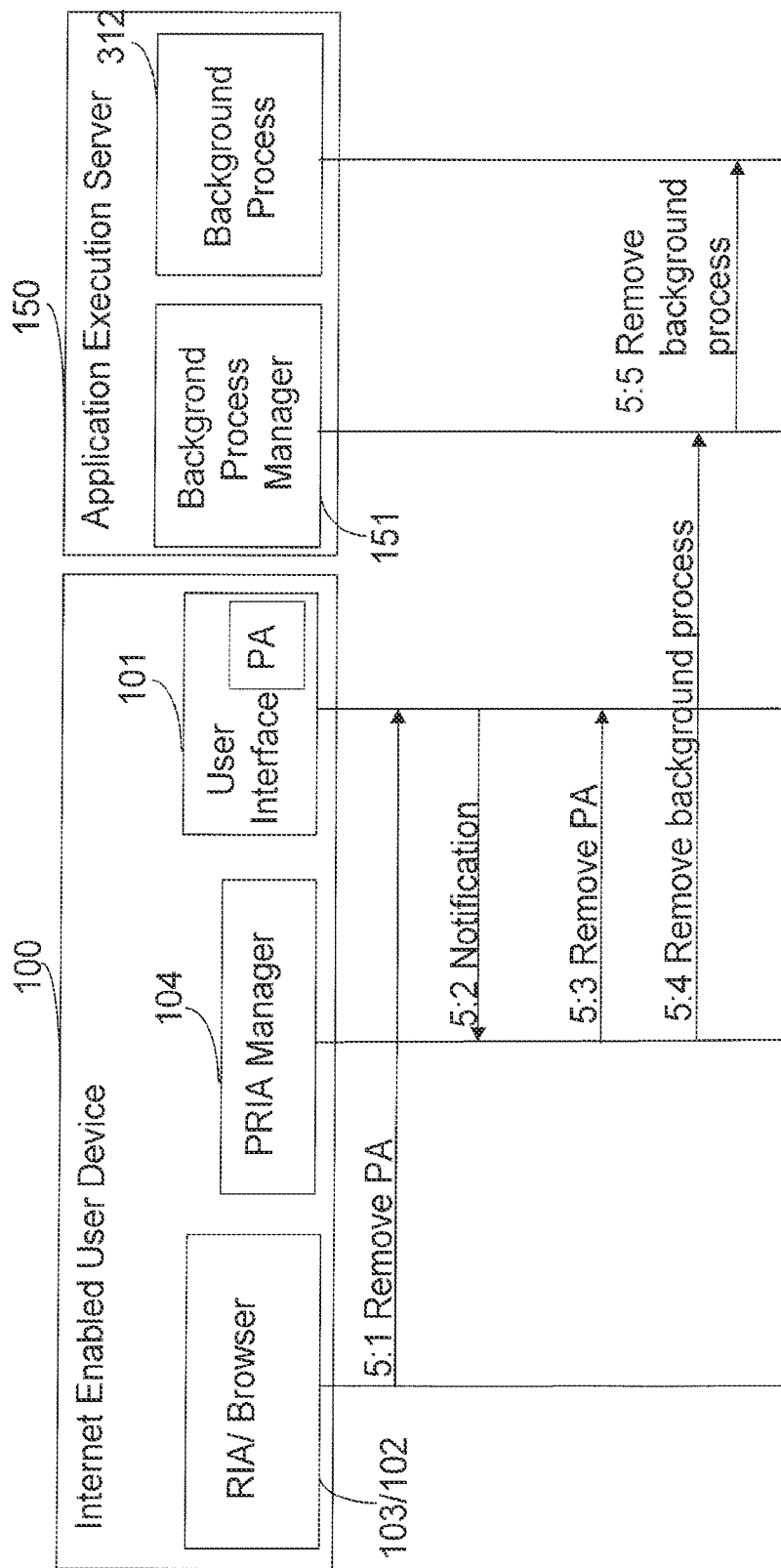
FIG. 5 is a simplified signaling scheme, illustrating a Procedure for terminating a Background Process and a Persistent Rich Internet Application, according to one exemplified embodiment.

FIG. 5 illustrates a possible scenario for actively removing a Background Process 312, associated with a RIA 103.

In a first step 5:1 a user, which has decided to remove Background Process 312, first selects an option to remove an associated PA from a UI 101, of the Internet Enabled User Device 100. A notification of the requested removal of the PA is then transmitted from UI 101 to PRIA Manager 104, as indicated with another step 5:2. PRIA Manager 104 responds to such a notification by removing the PA, as indicated in a subsequent step 5:3.

PRIA Manager 104 also transmits a message, requesting the Background Process Manager 151 to remove the Background Process 312, as indicated with another step 5:4. In response, Background Process Manager 151 removes the Background Process 312, as indicated with a final step 5:5.

Figure 6A:
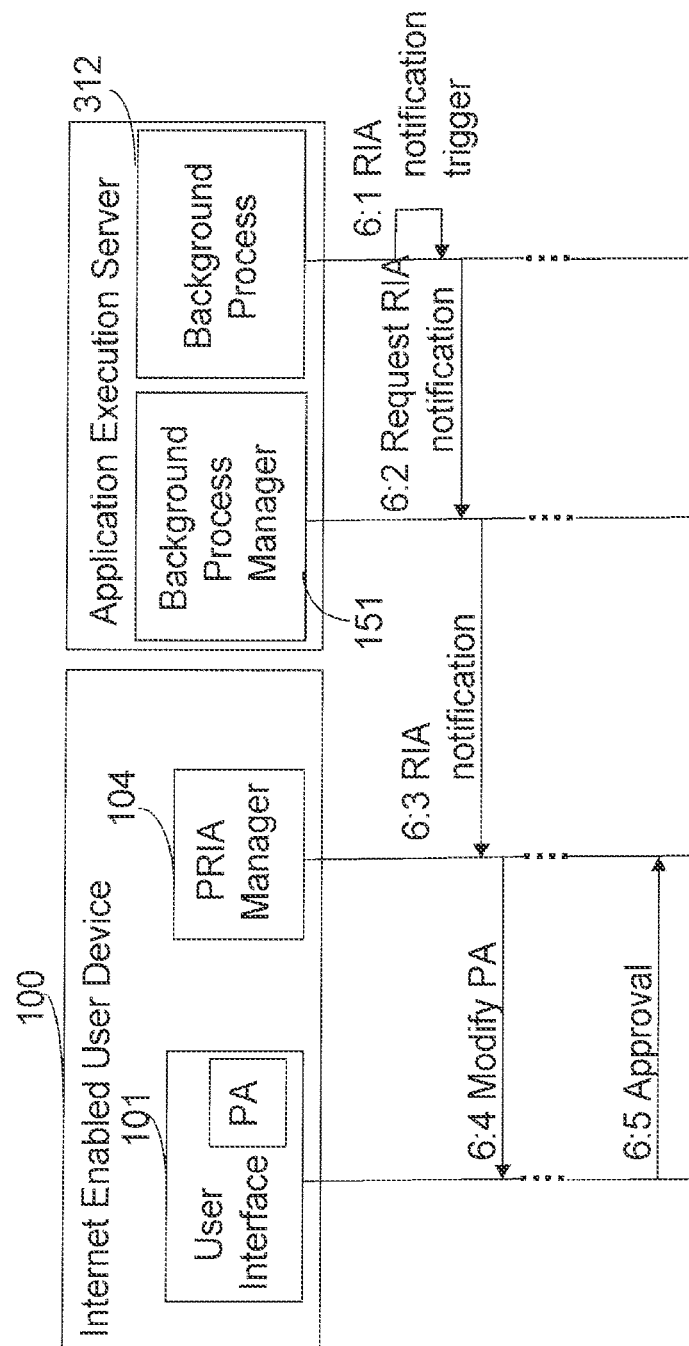
FIG. 6a is a simplified signaling scheme, illustrating a procedure for notifying a user of an event, associated with a Background Process, according to one exemplified embodiment.

Yet another signaling diagram, namely FIG. 6*a*, illustrates how the suggested PRIA enabled mechanism may be applied for the purpose of notifying a user of an event that has been triggered in a Background Process, thereby enabling the user to be aware of that a certain event has occurred, such that the user may decide to approve with, or ignore, a process started with the notification, to commence. The suggested notification process is typically only required when the RIA, associated with the notifying Background Process and/or the Web Browser of the Internet Enabled User Device 100 is closed. After the associated RIA has been resumed, a number of alternative options for continued communication, either between the RIA and the associated Background Process, or between the RIA and the PRIA Manager 104 will be possible.

In a first step 6:1, the processing of a Background Process 312 has reached a point where a notification of the associate RIA is required, i.e. a RIA notification trigger has been launched, due to the occurrence of a specific event. According to one exemplified scenario, the Background Process 312 may be configured to poll a specified third party server (not shown) for new data, where occurrence of new data may trigger a RIA notification at the Background Process 312. In response to recognizing a notification trigger, the Background Process 312 requests the Background Process Manager 151 to launch a notification, as indicated with a next step 6:2, and in a subsequent step 6:3, PRIA Manager 104, which is aware that the Web Browser and/or the associated RIA is closed, transmits the notification to the relevant PRIA Manager 104.

Upon receiving a notification, PRIA Manager 104 executes a notification procedure, wherein the respective PA is modified accordingly via UI 101, as indicated with another step 6:4. Once PRIA Manager 104 has executed the notification procedure, the described PRIA process will typically not commence until user approval is recognized by the PRIA Manager, as indicated with another step 6:5. Such an approval may typically be executed by a user clicking on the modified PA. If RPC is applied, a PA object may be running in the Background Process, where a modification on this object will result in a notification being triggered and sent to the PRIA Manager 104. At the PRIA Manager 104, the content of the notification will then be interpreted and the PA will be modified accordingly.

According to another alternative embodiment, also relying on the RPC mechanism, no PA has been pre-defined for the Background Process at PRIA Manager 104. Instead a predefined RPC-call is transmitted to the PRIA Manager 104 which comprises corresponding pre-defined functions, which are launched, such that a required PA modification can be requested from PRIA Manager.

According to yet another embodiment, which may be applicable if the REST mechanism is applied, each PA is accessible from an associated Background Process as a REST resource.

Once a user has given his approval to continue to resume a respective RIA, various types of procedures, such as e.g. a procedure for updating the respective RIA, for enabling the user to interact with the PRIA Manager, and/or for enabling the user to interact with the notifying Background Process may be initiated.

One exemplifying scenario, illustrating a series of steps which, according to one embodiment, may follow a successful notification, such as the one described above with reference to FIG. 6*a*, will now be described below with reference to the signaling diagram of FIG. 6*b*.

Figure 6B:
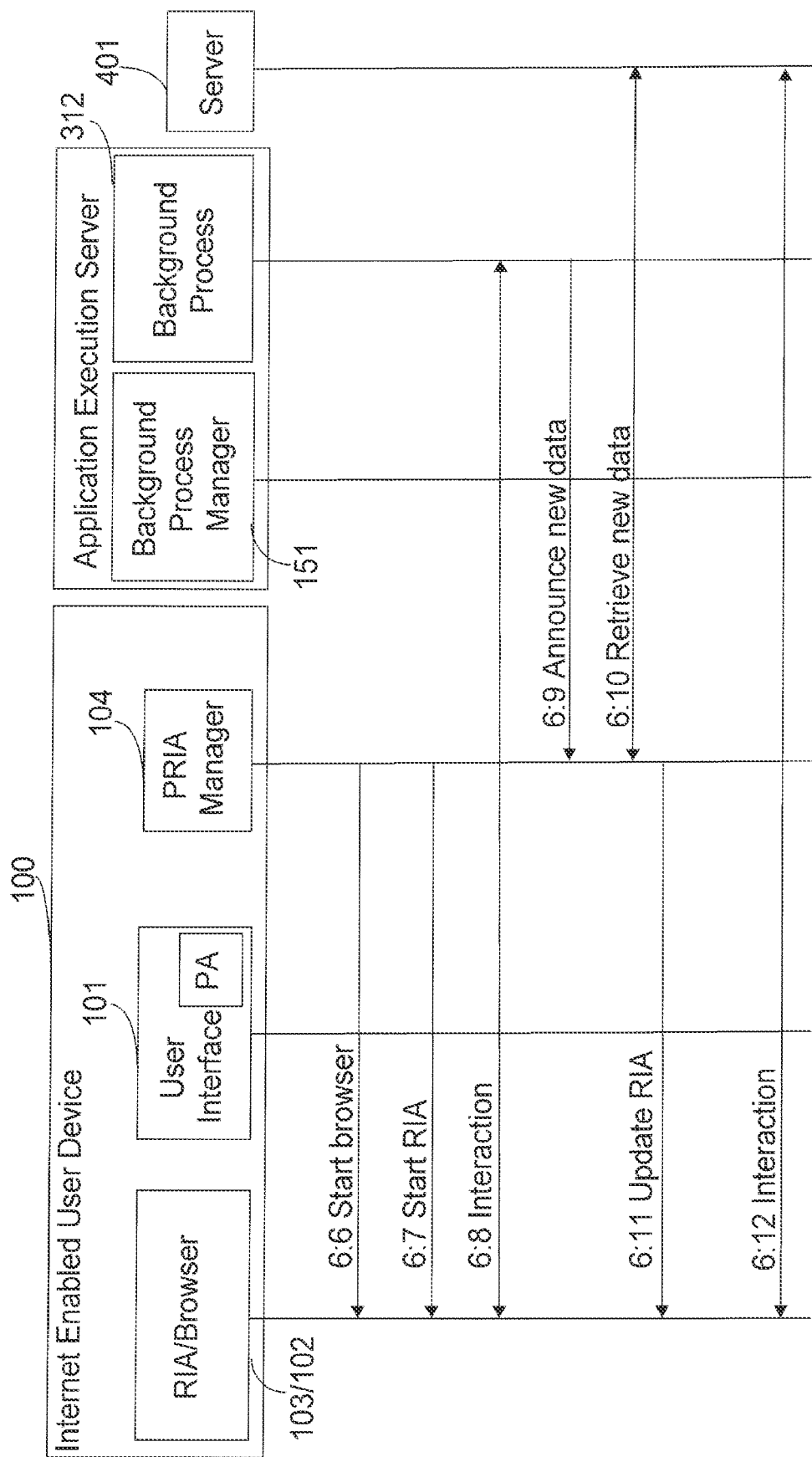
FIG. 6b is a simplified signaling scheme, illustrating a Procedure for enabling interaction between a Persistent Rich Internet Application and a Background Process, according to one exemplified embodiment.

According to the signaling diagram of FIG. 6*b*, an approval results in the Web Browser 102 and/or RIA 103 being started by PRIA Manager 104, as indicated with steps 6:6 and/or 6:7. Once both Web Browser 102 and RIA 103 are active, a browsing user may continue the initiated PRIA process, by interacting with the Background Process 312. According to FIG. 6*b*, an interaction commences between RIA/Web Browser 103,102 and the associated Background Process 312, as indicated with a subsequent step 6:8. Such an interaction may e.g. result in the Background Process 312 instructing PRIA Manager 104 to retrieve new data, as indicated with another step 6:9, whereby PRIA Manager 104 retrieves the new data from server 401, as indicated with a subsequent step 6:10, after which RIA 103 may be updated, as indicated with step 6:11. Next, the interaction may continue, according to the respective PRIA associated instructions, as indicated with another step 6:12.

As already mentioned above, a Background Process may also be configured to interact with a Device Interface of an Internet Enabled User Device. If such a communication is to be applied the Background Process may execute one or more tasks with or without involving the associated RIA.

According to another alternative embodiment, which will now be described below with reference to the signaling diagram of FIG. 6c, Web Browser 102 and RIA 103 are both open/activated, as indicated with steps 6:6' and 6:7', but no Background Process is to be actively involved in the remaining process. Instead the RIA Manager 104 opens the RIA URL in the Web Browser again, thereby enabling the procedure started from the RIA to commence. The upcoming processing steps may e.g. include, reloading of data from an external server 401 to the Internet Enabled User Device 100 under supervision of the PRIA Manager 104. The reloaded data may e.g. comprise a set of pre-defined instructions, which have been specified for the relevant PRIA. The acquired data may then be used by RIA 103, without involving the associated Background Process. Such a procedure is illustrated with subsequent steps 6:8' and 6:9'.

Methods for using entities, such as the ones described above, for creating, managing and terminating a Background Process, as well as to manage notifications and subsequent interactions, will now be described below with reference to a number of flow charts, with reference to FIGS. 7a-8c, respectively.

Figure 7A:
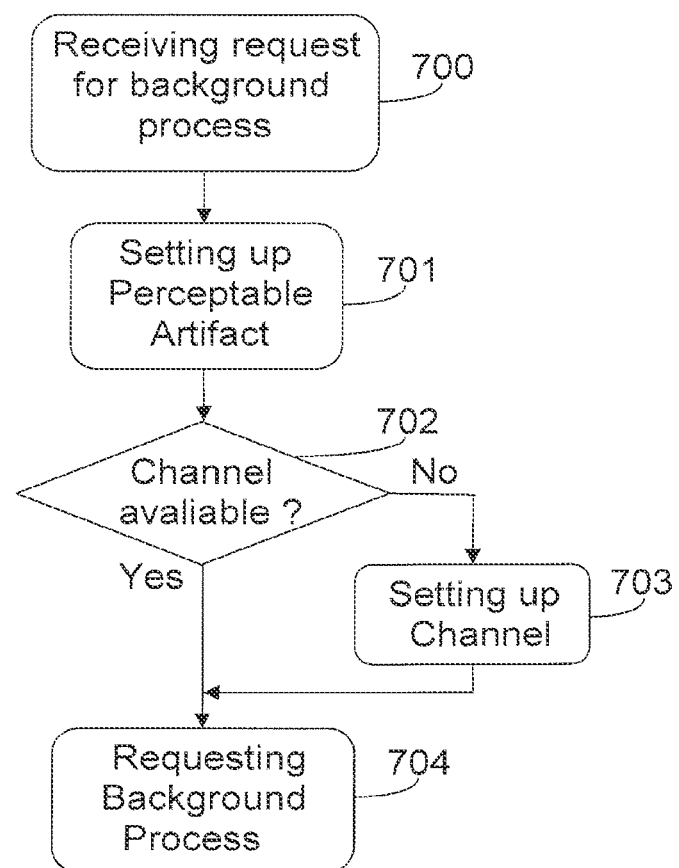
FIG. 7a is a simplified flow chart, illustrating method steps for setting up a Persistent Rich Internet Application, according to one embodiment, which is to be executed at an Internet Enabled User Device.

FIG. 7a refers to a method for initiating, or creating, a new Background Process at an Application Execution Server, which is executed at a PRIA Manager, or a corresponding functional entity, of an Internet Enabled User Device.

In a first step 700, a request for creating a PA is received from the Internet Enabled User Device. As indicated in a subsequent step 701, such a request is responded to by setting-up a PA on the user device's UI, according to content of the request. In a next step, 702 it is determined whether there is any channel available to the relevant Application Execution Server. If this is not the case, such a communication is established in a subsequent step 703. A request for setting up an associated Background Process is then prepared, according to content of the request, and the request is then sent to the Application Execution Server, according to a next step 704.

Figure 7B:
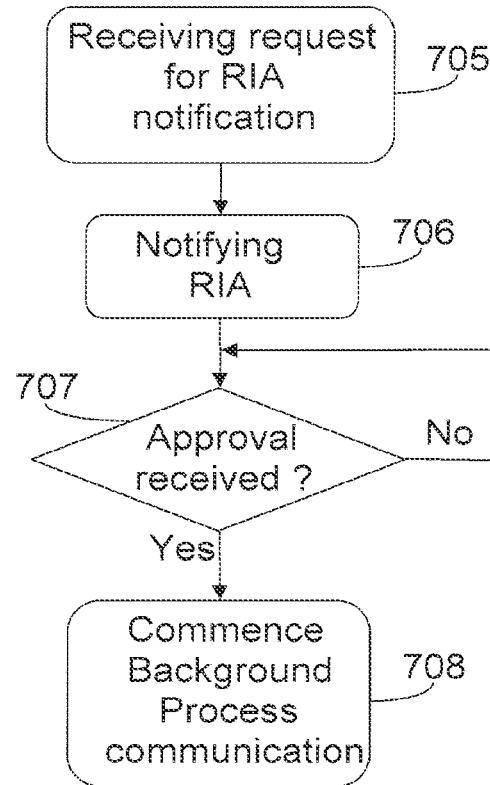
FIG. 7b is a simplified flow chart, illustrating method Steps for handling a notification, according to one embodiment, which is to be executed at an Internet Enabled User Device.

FIG. 7b refers to exemplifying method steps to be executed at an Internet Enabled User Device, for enabling communication between a running Background Process and the Internet Enabled User Device, by way of managing a notification process at the Internet Enabled User Device.

In a first step 705, a message, requesting for a notification, is received from the Background Process, and in a subsequent step 706, a PRIA manager of the Internet Enabled User Device executes a notification via the relevant PA. The PRIA manager then awaits an approval for continuing the initiated interaction process, i.e. a response to the notification, as indicated with a step 707, and once approved, the Background Process is notified of the approval and the process initiated by the notification may commence, typically by receiving instructions from the Background Process provided in one or more messages, and by executing such instructions accordingly, as indicated with a subsequent step 708. If the Web Browser and the notified RIA are active, step 707 may be ignored, and thus, the Background Process may be informed by the PRIA Manager to commence the requested event initiated process immediately.

Figure 7C:
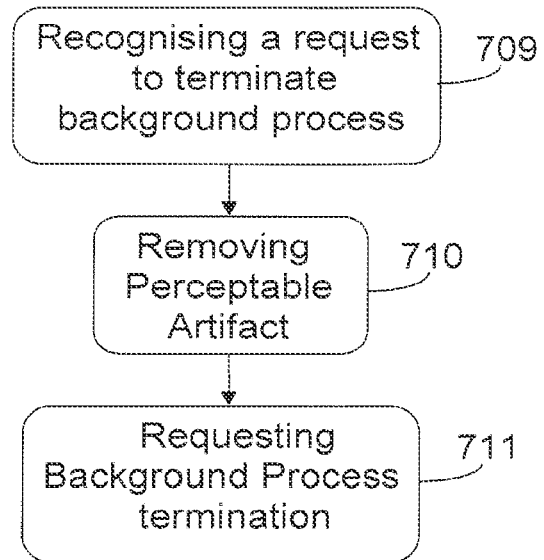
FIG. 7c is a simplified flow chart, illustrating method steps for terminating a background Process, according to one embodiment, which is to be executed at an Internet Enabled User Device.

FIG. 7c refers to another exemplifying procedure, described with a series of method steps to be executed at an Internet Enabled User Device when a Background Process is to be terminated from the Internet Enabled User Device. In a first step 709, a request for removing a PA is received from a RIA, which is responded to, typically by a PRIA Manager of the Internet Enabled User Device, by removing the PA, as indicated with a subsequent step 710, and another subsequent step 711, which indicates that an Application Execution Server is instructed to terminate the associated Background Process.

Figure 8C:
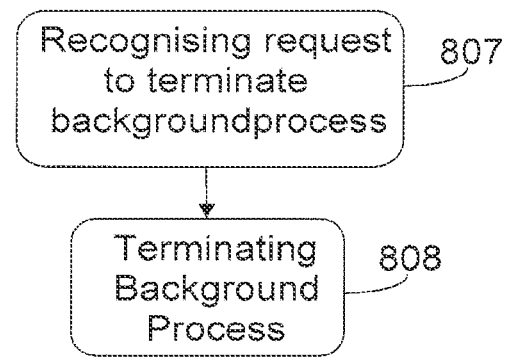
FIG. 8c is a simplified flow chart, illustrating method steps for terminating a Background Process, according to one embodiment, which is to be executed at an Application Execution Server.
Figure 8A:
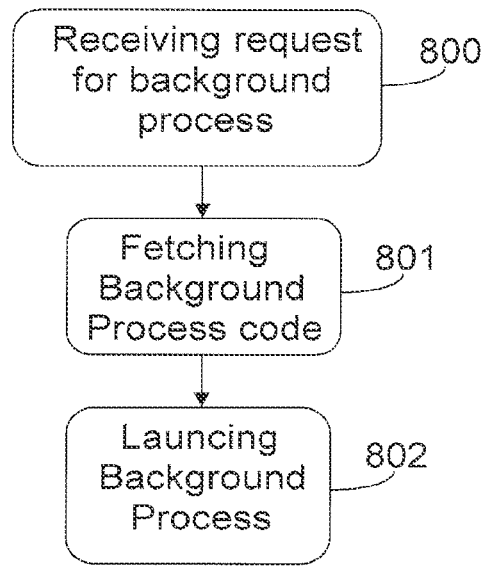
FIG. 8a is a simplified flow chart, illustrating method steps for creating a Background Process, according to one embodiment, which is to be executed at an Application Execution Server.
Figure 8B:
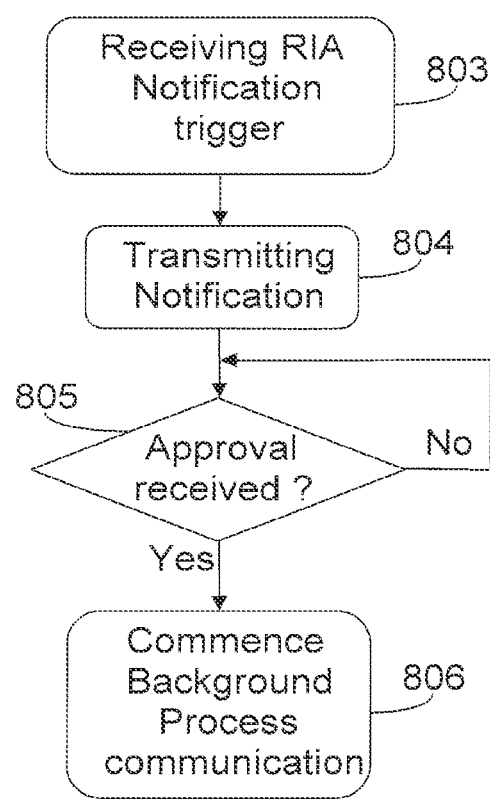
FIG. 8b is a simplified flow chart, illustrating method steps for handling a notification from a Background Process/ according to one embodiment, which is to be executed at an Application Execution Server.

FIGS. 8a-c illustrates corresponding method steps to be executed at an Application Execution Server when a Background Process is to be created, terminated or managed, respectively.

In FIG. 8a, exemplifying steps for managing a request for a new Background Process, according to one embodiment, a request for a new Background Process is first received in a message, provided from an Internet Enabled User Device, as indicated with step 800.

In a next step 801, relevant Background Process code is acquired, according to the content of the message. Once the relevant code has been obtained, the Application Execution Server perform pre-defined instructions, by executing relevant code, such that a respective Background Process can be launched, according to the request, as indicated with another step 802.

FIG. 8b illustrates another set of method steps, according to one embodiment, which enables communication between a Background Process and a RIA, which is to be executed by an Application Execution Server.

In a first step 803, the Application Execution Server receives a trigger for a notification from the Background Process. In a next step 804, the Application Execution Server prepares a message, comprising a request for a notification and transmits the message to the Internet Enabled User Device which is connected to the RIA. The Background Process then awaits an approval of the notification, which is to be considered as an indication to the Background Process to continue the started communication process with the respective RIA, according to how the instructions of the Background Process. This is indicated with the loop referred to as step 805.

Once an approval has been received by the Application Execution Server, the process may commence, as indicated with a step 806, or even terminate, depending on the respective instructions of the Background Process.

FIG. 8c, is another signaling scheme, which illustrates another set of exemplifying method steps which may be executed at an Application Execution Server in order to execute a required termination of a Background Process.

According to the present example, a running Background Process may be terminated by first recognizing a Background Process termination request at the Application Execution Server, as indicated with a step 807. Such a request may be received from the Internet Enabled User Device which is connected to a RIA, in response to a user interaction entered by a user via a corresponding PA, in response to faulty or suspicious code recognized by the Internet Enabled User Device, or by receiving a trigger from the Background Process, e.g. once a required process has been completed. Application Execution Server responds to such a request by terminating the Background Process, as indicated with step 808.

Throughout this document, the terms used for expressing logical devices, entities or nodes, such as e.g. "Application Execution Server", Background Process Manager", PRIA Manager", "Server Network Function" and "Client Network Function" are to be interpreted merely as exemplifying expressions, which may be expressed in a number of alternative ways.

In addition, while the described arrangements and method steps have been described with reference to specific exemplary embodiments, the description is generally only intended to illustrate the described inventive concept and should not be taken as limiting the scope of what has been defined by the appended claims.

ABBREVIATIONS

D-BUS Desktop bus
HTML Hyper Text Markup Language
HTTP Hyper Text Transport Protocol
JSON JavaScript Object Notation
NPAPI Netscape Plug-In Application Programming Interface
PA Perceptible Artifact
PRIA Persistent Rich internet Application
REST Representational State Transfer
RIA Rich Internet Application
RPC Remote Procedure Call
SMS Short Message Services
URL Uniform Resource Locator
XML Extensible Markup Language

The invention claimed is:

1. A method of managing execution of a web application, implemented by a processor of a user device, the method comprising:
   executing the web application via a web browser on the user device;
   transmitting a request by the web application to an application server requesting the application server to recognize a trigger event associated with the web application and to send a notification to the user device indicating occurrence of the trigger event;
   adding an icon associated with the web application to a user interface of the user device and executing icon code configured to change appearance of the icon on the user interface in response to receiving the notification indicating occurrence of the trigger event associated with the web application;
   terminating execution of the web application by the user device, wherein the icon code continues to be executed by the user device after the execution of the web application is terminated;
   receiving the notification from the application server and causing the icon code to change appearance of the icon on the user interface in response to the notification; and
   responding to the icon being clicked by a user by launching execution of the web application.

2. The method of claim 1, wherein:
   the request is transmitted by the web application to the application server through a communication channel between the web application and the application server, wherein the communication channel between the web application and the application server is terminated responsive to execution of the web application becoming terminated by the user device.

3. The method of claim 1, further comprising:
   maintaining a persistent communication channel between the icon code and the application server independent of whether execution of the web application has been terminated; and
   receiving the notification through the persistent communication channel and causing the icon code to change appearance of the icon on the user device, independent of whether execution of the web application has been terminated.

4. The method of claim 3, wherein:
   the notification is received as a push based event notification through the persistent communication channel.

5. The method of claim 1, wherein the icon code changes appearance of size, color, and/or shape of the icon on the user user interface in response to the notification.

6. The method of claim 1, further comprising:
   displaying by the web application a message on the user interface that prompts the user with an offer to add the icon for the web application to be displayed on the user interface and which enables selection of the icon by the user to launch execution of the web application by the user device; and
   based on receiving an indication from the user device indicating acceptance of the offer, initiating the adding of the icon to the user interface and execution of the icon code configured to change appearance of the icon.

7. The method of claim 6, further comprising:
   based on receiving the indication from the user device indicating acceptance of the offer, establishing a persistent communication channel between the icon code and the application server, wherein the notification is received through the persistent communication channel.

8. A computer program product comprising a non-transitory compute readable medium storing instructions executable by a processor of a user device to perform operations to:
   execute a web application via a web browser on the user device;
   transmit a request by the web application to an application server requesting the application server to recognize a trigger event associated with the web application and to send a notification to the user device indicating occurrence of the trigger event;
   add an icon associated with the web application to a user interface of the user device and execute icon code configured to change appearance of the icon on the user interface in response to receiving the notification indicating occurrence of the trigger event associated with the web application;
   terminate execution of the web application by the user device, wherein the icon code continues to be executed by the user device after the execution of the web application is terminated;
   receive the notification from the application server and cause the icon code to change appearance of the icon on the user interface in response to the notification; and
   respond to the icon being clicked by a user by launching execution of the web application.

9. The computer program product of claim 8, wherein:
   the request is transmitted by the web application to the application server through a communication channel between the web application and the application server, wherein the communication channel between the web application and the application server is terminated responsive to execution of the web application becoming terminated by the user device.

10. The computer program product of claim 8, wherein the operations further comprise to:
- maintain a persistent communication channel between the icon code and the application server independent of whether execution of the web application has been terminated; and
- receive the notification through the persistent communication channel and cause the icon code to change appearance of the icon on the user device, independent of whether execution of the web application has been terminated.

11. The computer program product of claim 10, wherein:
- the notification is received as a push based event notification through the persistent communication channel.

12. The computer program product of claim 8, wherein the icon code changes appearance of size, color, and/or shape of the icon on the user user interface in response to the notification.

13. The computer program product of claim 8, wherein the operations further comprise to:
- display by the web application a message on the user interface that prompts the user with an offer to add the icon for the web application to be displayed on the user interface and which enables selection of the icon by the user to launch execution of the web application by the user device; and
- based on receiving an indication from the user device indicating acceptance of the offer, initiate the adding of the icon to the user interface and execution of the icon code configured to change appearance of the icon.

14. The computer program product of claim 13, wherein the operations further comprise to:
- based on receiving the indication from the user device indicating acceptance of the offer, establish a persistent communication channel between the icon code and the application server, wherein the notification is received through the persistent communication channel.

15. A user device comprising:
- a processor and a memory, the memory containing instructions executable by the processor to:
  - execute a web application via a web browser on the user device;
  - transmit a request by the web application to an application server requesting the application server to recognize a trigger event associated with the web application and to send a notification to the user device indicating occurrence of the trigger event;
  - add an icon associated with the web application to a user interface of the user device and execute icon code configured to change appearance of the icon on the user interface in response to receiving the notification indicating occurrence of the trigger event associated with the web application;
  - terminate execution of the web application by the user device, wherein the icon code continues to be executed by the user device after the execution of the web application is terminated;
  - receive the notification from the application server and causing the icon code to change appearance of the icon on the user interface in response to the notification; and
  - respond to the icon being clicked by a user by launching execution of the web application.

16. The user device of claim 15, wherein:
- the request is transmitted by the web application to the application server through a communication channel between the web application and the application server, wherein the communication channel between the web application and the application server is terminated responsive to execution of the web application becoming terminated by the user device.

17. The user device of claim 15, wherein the instructions are further executable by the processor to:
- maintain a persistent communication channel between the icon code and the application server independent of whether execution of the web application has been terminated; and
- receive the notification through the persistent communication channel and cause the icon code to change appearance of the icon on the user device, independent of whether execution of the web application has been terminated.

18. The user device of claim 17, wherein:
- the notification is received as a push based event notification through the persistent communication channel.

19. The user device of claim 15, wherein the icon code changes appearance of size, color, and/or shape of the icon on the user user interface in response to the notification.

20. The user device of claim 15, wherein the instructions are further executable by the processor to:
- display by the web application a message on the user interface that prompts the user with an offer to add the icon for the web application to be displayed on the user interface and which enables selection of the icon by the user to launch execution of the web application by the user device; and
- based on receiving an indication from the user device indicating acceptance of the offer, initiate the adding of the icon to the user interface and execution of the icon code configured to change appearance of the icon.

21. The user device of claim 20, wherein the instructions are further executable by the processor to:
- based on receiving the indication from the user device indicating acceptance of the offer, establish a persistent communication channel between the icon code and the application server, wherein the notification is received through the persistent communication channel.

* * * * *

UNITED STATES PATENT AND TRADEMARK OFFICE
CERTIFICATE OF CORRECTION

| | | |
|---|---|---|
| PATENT NO. | : 11,915,020 B2 | |
| APPLICATION NO. | : 18/124830 | |
| DATED | : February 27, 2024 | |
| INVENTOR(S) | : Kristiansson et al. | |

It is certified that error appears in the above-identified patent and that said Letters Patent is hereby corrected as shown below:

On the Title Page

Item (57), under "ABSTRACT", in Column 2, Lines 9-10, delete "rich Internet application" and insert -- Rich Internet Application --, therefor.

In the Drawings

In Figure 4, Sheet 4 of 12, Tag "100", Line 1, delete "EnabledUser" and insert -- Enabled User --, therefor.

In Figure 5, Sheet 5 of 12, Tag "151", Line 1, delete "Backgrond" and insert -- Background --, therefor.

In Figure 7a, Sheet 9 of 12, and on the title page, the illustrative print figure, Tag "701", Line 2, delete "Perceptable" and insert -- Perceptible --, therefor.

In Figure 7a, Sheet 9 of 12, and on the title page, the illustrative print figure, Tag "702", Line 2, delete "avaliable ?" and insert -- available? --, therefor.

In Figure 8c, Sheet 10 of 12, Tag "807", Line 3, delete "backgroundprocess" and insert -- background process --, therefor.

In Figure 7c, Sheet 11 of 12, Tag "710", Line 2, delete "Perceptable" and insert -- Perceptible --, therefor.

In Figure 8a, Sheet 11 of 12, Tag "802", Line 1, delete "Launcing" and insert -- Launching --, therefor.

Signed and Sealed this
Twenty-eighth Day of May, 2024

Katherine Kelly Vidal
*Director of the United States Patent and Trademark Office*

CERTIFICATE OF CORRECTION (continued)

In the Specification

In Column 1, Line 9, delete "2021," and insert -- 2021, now U.S. Pat. No. 11,709,689, --, therefor.

In Column 1, Line 37, delete "do no" and insert -- no --, therefor.

In Column 1, Line 63, delete "according" and insert -- according to --, therefor.

In Column 3, Line 4, delete "may be to prefer" and insert -- may be preferred --, therefor.

In Column 4, Line 45, delete "description following" and insert -- description --, therefor.

In Column 5, Line 67, delete "consisting" and insert -- consisting of --, therefor.

In Column 6, Line 9, delete "independent" and insert -- independently --, therefor.

In Column 8, Line 4, delete "PRIA, As" and insert -- PRIA, as --, therefor.

In Column 8, Line 39, delete "relay" and insert -- rely --, therefor.

In Column 8, Line 58, delete "were" and insert -- where --, therefor.

In Column 10, Line 12, delete "PRIA Manager 106." and insert -- PRIA Manager 104. --, therefor.

In Column 10, Line 45, delete "server" and insert -- Server --, therefor.

In Column 10, Line 52, delete "Web Browser 10," and insert -- Web Browser 102, --, therefor.

In Column 11, Line 24, delete "PRIA Manager 106," and insert -- PRIA Manager 104, --, therefor.

In Column 11, Line 41, delete "PA/RIA Function 300" and insert -- PA/RIA Function 301 --, therefor.

In Column 12, Line 13, delete "straight forward" and insert -- straightforward --, therefor.

In Column 13, Line 31, delete "the PRIA associated code into a new Background Process," and insert -- PRIA associated code into a new Background Process, upon having created this new Background Process, --, therefor.

In Column 16, Line 15, delete "illustrates" and insert -- illustrate --, therefor.

In Column 17, Lines 3-4, delete "Background Process Manager", PRIA Manager"," and insert -- "Background Process Manager", "PRIA Manager", --, therefor.

In Column 17, Line 20, delete "HTTP Hyper Text Transport Protocol" and insert -- HTTP Hypertext Transfer Protocol --, therefor.

CERTIFICATE OF CORRECTION (continued)
U.S. Pat. No. 11,915,020 B2

In Column 17, Line 25, delete "internet" and insert -- Internet --, therefor.

In the Claims

In Column 18, Line 16, in Claim 5, delete "user user" and insert -- user --, therefor.

In Column 19, Line 17, in Claim 12, delete "user user" and insert -- user --, therefor.

In Column 20, Line 35, in Claim 19, delete "user user" and insert -- user --, therefor.